(No Model.)

C. H. COOK.
BALL BEARING.

No. 548,155. Patented Oct. 15, 1895.

WITNESSES
H. A. Lamb
S. V. Richardson.

INVENTOR
Charles H. Cook
By
A. M. Wooster
Atty.

ANDREW B.GRAHAM, PHOTO-LITHO. WASHINGTON, D.C.

UNITED STATES PATENT OFFICE.

CHARLES H. COOK, OF SOUTH NORWALK, CONNECTICUT, ASSIGNOR, BY MESNE ASSIGNMENTS, TO ALDEN SOLMANS, OF SAME PLACE.

BALL-BEARING.

SPECIFICATION forming part of Letters Patent No. 548,155, dated October 15, 1895.

Application filed April 9, 1894. Serial No. 506,825. (No model.)

*To all whom it may concern:*

Be it known that I, CHARLES H. COOK, a citizen of the United States, residing at South Norwalk, in the county of Fairfield and State of Connecticut, have invented certain new and useful Improvements in Ball-Bearings; and I do hereby declare the following to be a full, clear, and exact description of the invention, such as will enable others skilled in the art to which it appertains to make and use the same.

My invention has for its object to provide a ball-bearing adapted for general use, and especially adapted for use in carriages and wagons, the invention being simple, durable, inexpensive, and compact in form so that no removal of wood from the center of the hub is required, the parts of the bearing being so constructed that when once assembled they do not require to be taken apart in shipping or in putting them in position in a wheel, in which they may be inserted as conveniently as ordinary boxes, and when the wheel is removed from the axle both bearings complete are removed with it.

With these ends in view I have devised the novel construction, of which the following description, in connection with the accompanying drawings, is a specification, numbers and letters being used to designate the several parts.

Figure 1:
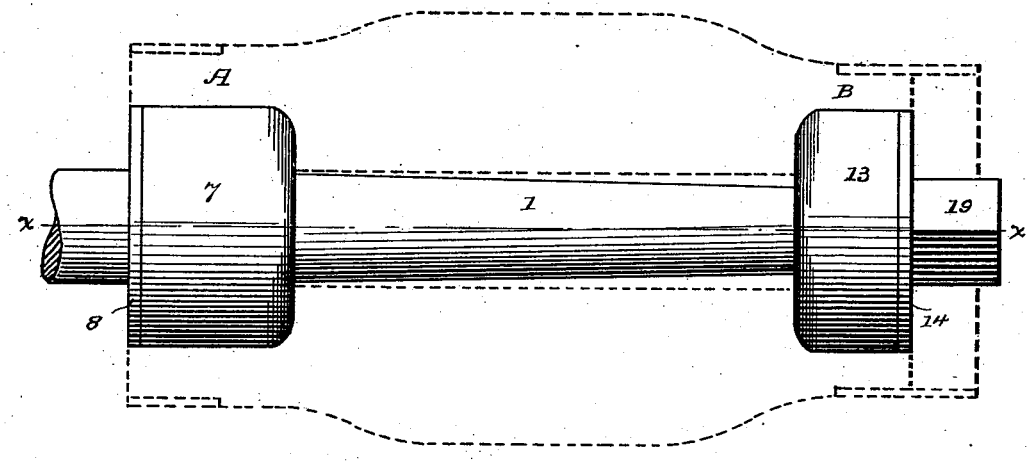
Figure 2:
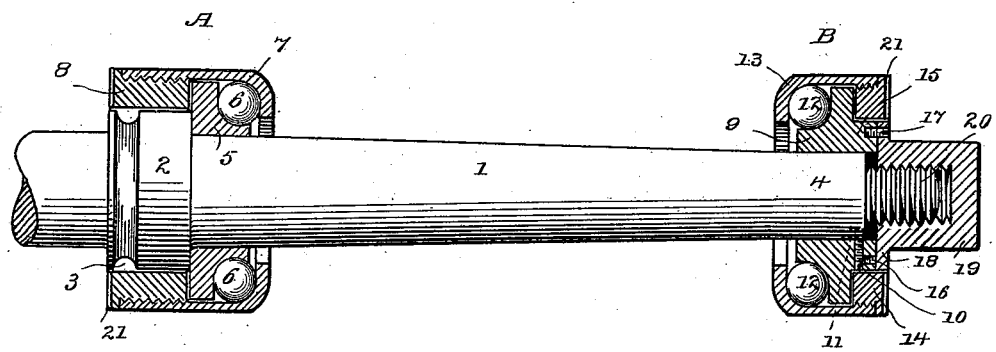
Figure 3:
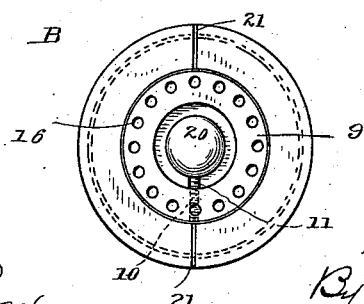

Figure 1 is an elevation of the inner and outer bearings of a wheel complete, the outline of the hub being indicated by dotted lines; Fig. 2, a longitudinal section on the line $x$ $x$ in Fig. 1, the axle being in elevation; and Fig. 3 is an end elevation, the nut which engages the end of the axle being removed.

1 denotes the axle, which is provided with the usual collar 2, having a dust-groove 3, and which is shown as tapered in the ordinary manner. It should be understood, however, that the shape of the axle is not of the essence of my invention, it being simply required that the outer end of the axle be of uniform diameter for a short distance, as at 4. By that I mean that at the outer end of the axle the opposite sides are parallel.

An important feature of my novel bearing is that the ordinary axle-boxes are entirely dispensed with, thereby avoiding the removal of wood from the central portion of the hub and leaving a very much stronger support for the tenons of the spokes. (Not shown in the drawings.)

It will be apparent from the drawings that the entire weight upon each wheel is supported at two bearing-points—*i. e.*, the two sets of balls. For convenience in description I will refer to these bearing-points as the "inner" and "outer" bearings, said bearings being designated, respectively, in the drawings by A and B. The inner bearing consists of a cone 5, which is driven up against collar 2 on the axle, so that the latter will not turn on the axle.

6 denotes the inner series of balls which lie between cone 5 and cap 7, the cap being suitably threaded to engage a sleeve 8, which turns freely on the axle, there being no strain upon the axle proper in use, the entire weight being upon the balls and cone. The outer bearing consists of a cone 9, which fits over portion 4 of the axle and is held against rotation thereon by a screw 10, which passes through cone 9 and engages a socket 11 at the end of the axle. (See dotted lines in Fig. 2 and full lines in Fig. 3.)

12 denotes the outer series of balls which lie between cone 9 and a cap 13, suitably threaded to engage a sleeve 14, which turns freely on reduced portion 15 of cone 9 the strain and weight being entirely upon the cap, balls, and cone, as in the other bearing. Both caps are provided with central openings 22, through which the axle passes freely, there being, moreover, no connection between the caps, so that the center of the hub does not require to be cut out as when the caps are connected by a sleeve.

In the outer face of cone 9 is a series of screw-holes 16, any one of which is adapted to be engaged by a screw 17, which passes through a flange 18 of the usual axle-nut 19, this nut being internally screw-threaded and engaging the usual screw 20 at the outer end of the axle.

The adjustment of the bearings will be obvious from the drawings. Should it be required to tighten up the bearings at any time in use, screw 17 would be removed and nut 19 turned inward slightly on the axle, the effect of which would be to force cone 9 inward on the axle—that is, toward the left, as seen in Fig. 2—and also to draw cap 7 toward the right, as seen in Fig. 2, thus moving both caps and cones slightly toward each other and reducing the size of the sockets in which the balls are contained. It will be apparent that bearings A and B are wholly independent of each other. In assembling the balls are first placed in the sockets, then the cones are placed in position, and then sleeves 8 and 14 are turned to place in the caps, the outer faces of these sleeves being provided with grooves 21 to receive a suitable key by which the sleeves are turned to place. After assembling the bearings do not require to be taken apart either in shipment or in use. When once placed in the hub, which I have indicated in Fig. 1 by dotted lines, the bearings remain there until the wheel is worn out. The wheel is slipped on and off the axle in the usual manner. After placing the wheel in position it is held there and the inner and outer bearings are both adjusted by turning nut 19 inward on screw 20. When the parts are at the required adjustment-nut 19 is locked in place by means of screw 17 in flange 18, which is turned inward into engagement with one of the holes 16 in the outer face of cone 9. It will be seen that this screw does away with all danger of the axle-nut becoming loose and the wheel dropping off in use.

Having thus described my invention, I claim—

An outer bearing consisting of a cone adapted to slide upon an axle and having screw holes in its outer face, means for securing said cone against rotation, a cap, a series of balls between said cone and cap, a sleeve threaded to engage the inner side of the cap whereby the cone and balls are held in place, a nut adapted to engage the end of the axle and bearing against the cone whereby the cone is adjusted relatively to the cap and a screw 17 adapted to pass through the nut and engage one of the holes in the outer face of the cone whereby the nut is locked in position after adjustment.

In testimony whereof I affix my signature in presence of two witnesses.

CHARLES H. COOK.

Witnesses:
JACOB M. LAYTON,
JAMES PAUL.